United States Patent [11] 3,612,568

| [72] | Inventor | Arney C. Stensrud<br>c/o Transpor Trailer, Inc. 333 W. 1st St.,<br>Dayton, Ohio 45402 |
|---|---|---|
| [21] | Appl. No. | 65,419 |
| [22] | Filed | Aug. 20, 1970 |
| [23] | | Continuation-in-part of Ser. No. 795,189,<br>Jan. 30, 1969, abandoned |
| [45] | Patented | Oct. 12, 1971 |

[54] STEERABLY WHEELED TRANSPORTABLE CARGO CONTAINER
13 Claims, 17 Drawing Figs.

[52] U.S. Cl. .................................................. 280/103,
220/1.5, 220/46 R, 280/444, 296/1 A
[51] Int. Cl. .................................................. B60p 1/00
[50] Field of Search .......................................... 280/103,
423, 444; 296/1, 28, 102; 105/366; 220/1.5, 46;
224/42.1; 214/152

[56] References Cited
UNITED STATES PATENTS

| 982,046 | 1/1911 | Flemming .................... | 220/85 |
|---|---|---|---|
| 1,900,756 | 3/1933 | Butts ........................... | 214/152 |
| 2,524,260 | 10/1950 | Hutson ......................... | 105/340 |
| 2,622,771 | 12/1952 | Tulou ........................... | 222/502 |
| 2,803,368 | 8/1957 | Koch ............................ | 220/4 |
| 2,931,664 | 4/1960 | Morling ........................ | 280/106 |
| 2,977,900 | 4/1961 | Farrar .......................... | 105/377 |
| 3,095,129 | 6/1963 | Kerr ............................. | 224/42.1 E |
| 3,221,921 | 12/1965 | Silverman ..................... | 220/46 |
| 3,358,616 | 12/1967 | Brodhead ..................... | 105/366 |
| 3,424,331 | 1/1969 | Borden ......................... | 220/1.5 |
| | | FOREIGN PATENTS | |
| 885,823 | 12/1961 | Great Britain ................ | 220/1.5 |
| 801,745 | 9/1958 | Great Britain ................ | 220/1.5 |

*Primary Examiner*—Leo Friaglia
*Attorney*—Marechal, Biebel, French & Bugg

ABSTRACT: The invention comprises a cargo container for use in loading merchandise onto auto hauling railway cars and trailers and the like, said container having flat bed member with wheels mounted thereon and a tow rod for towing the container from place to place, a removable top member, said flat bed member having narrow upright flanges along its outer edge, and said removable top having channel portions along its lower edge for mounting over said flanges to mount said top member to said flat bed member.

PATENTED OCT 12 1971 3,612,568

INVENTOR
Arney C. Stensrud

BY Maréchal, Biebel, French & Bugg
ATTORNEY

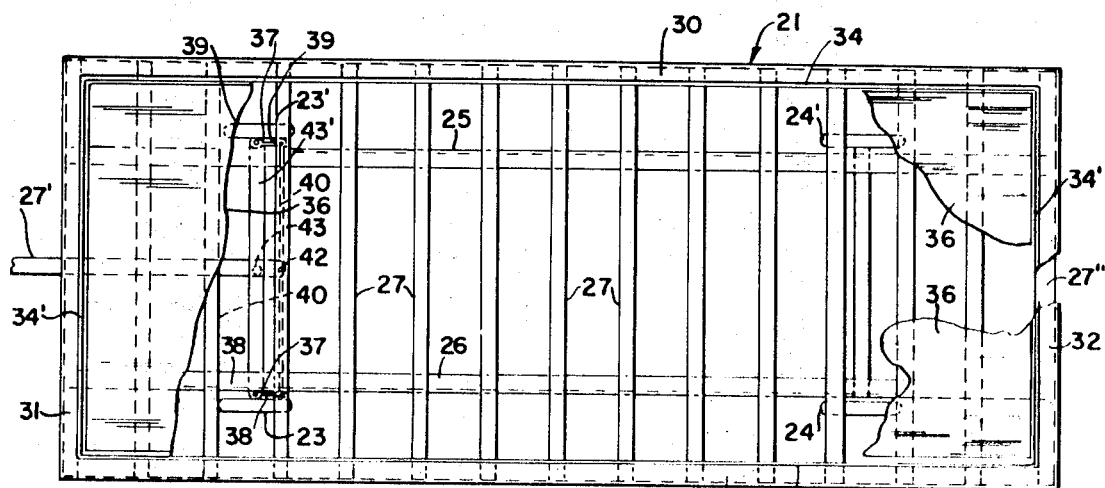
FIG. 6.
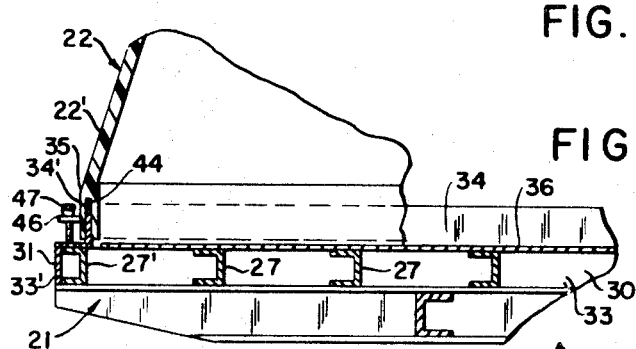
FIG. 7.
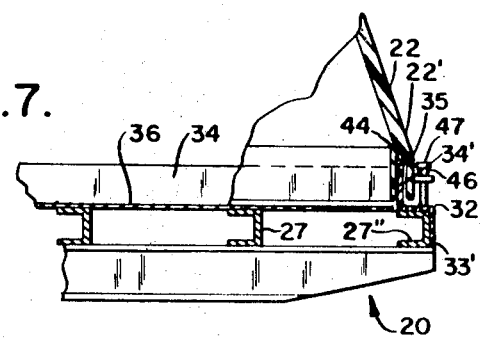
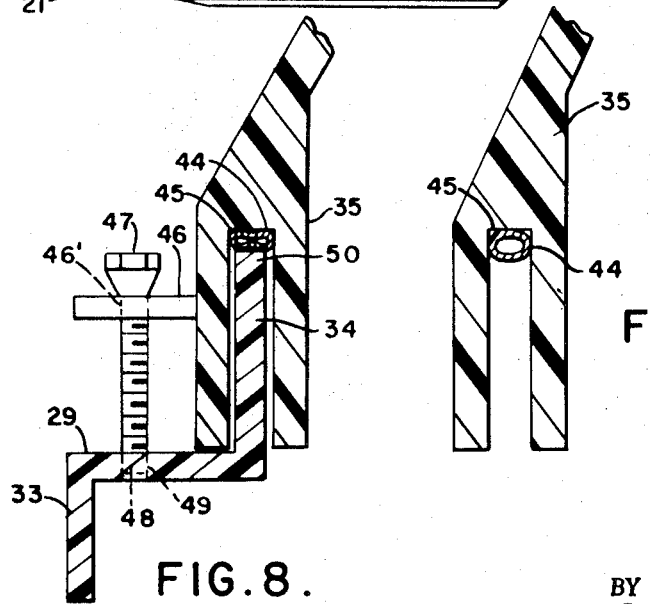
FIG. 9.
FIG. 8.
INVENTOR
Arney C. Stensrud
BY Marechal, Biebel, French & Bugg
ATTORNEY

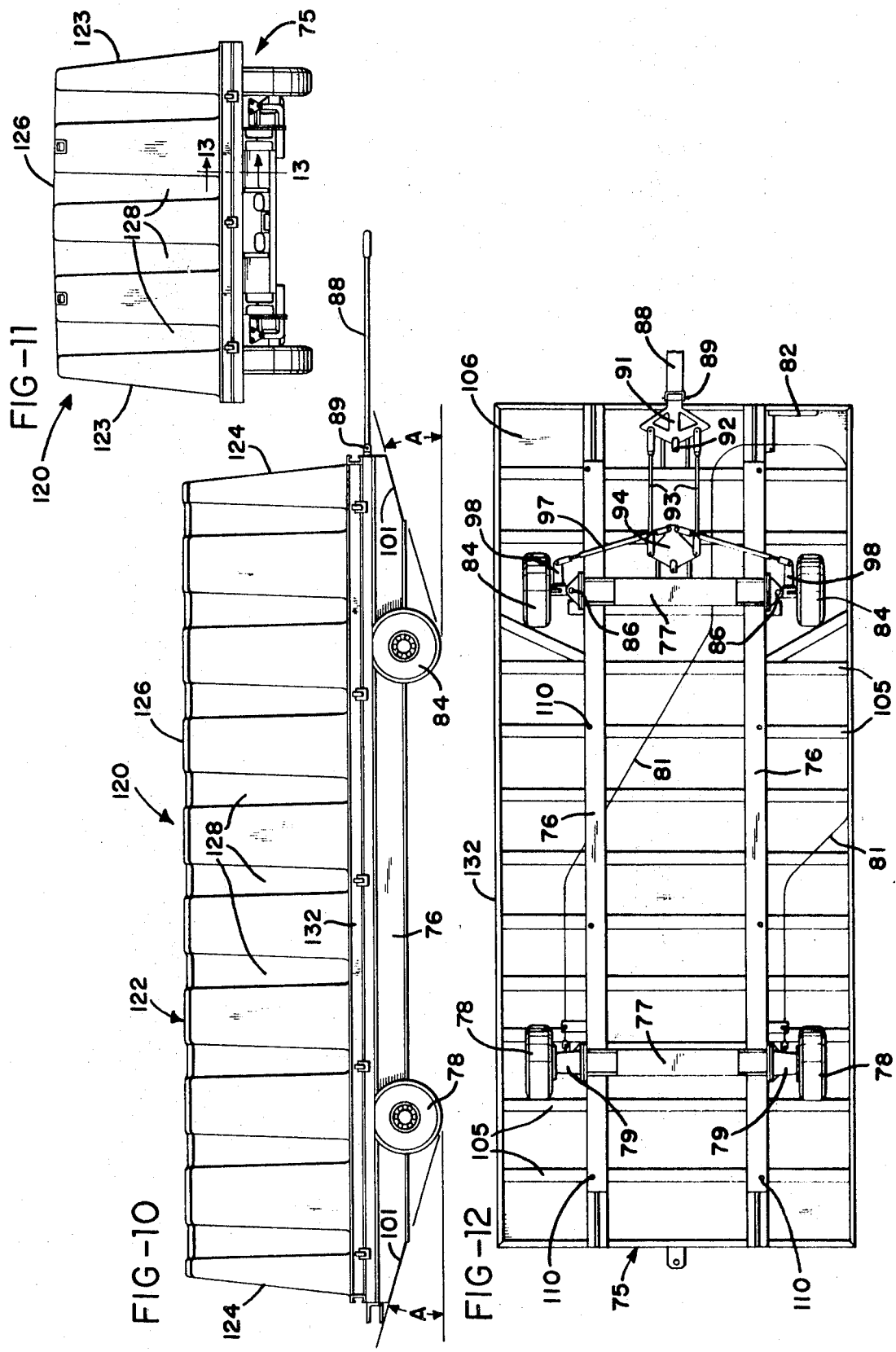

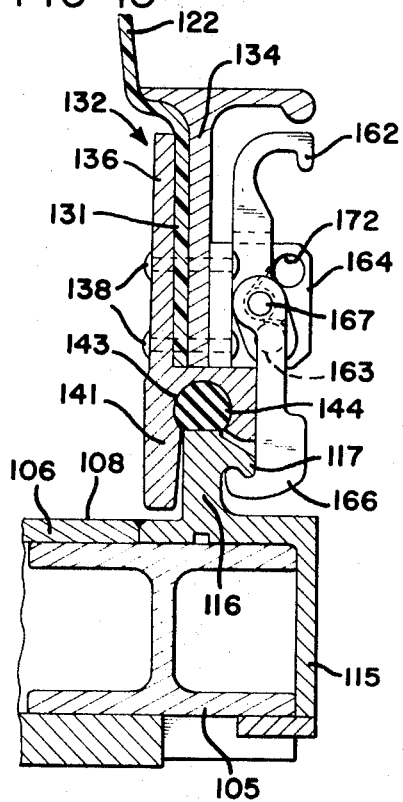
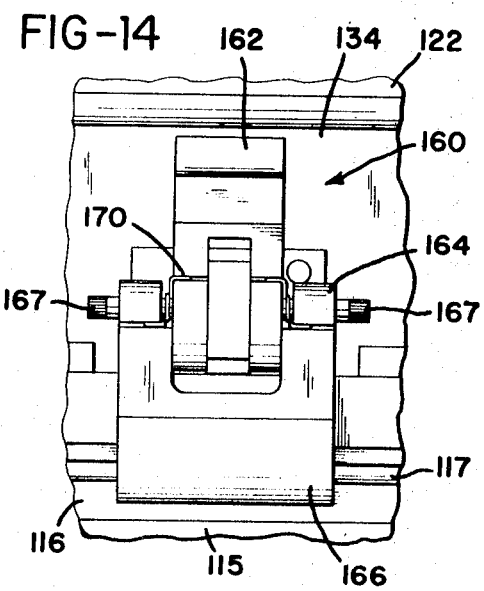
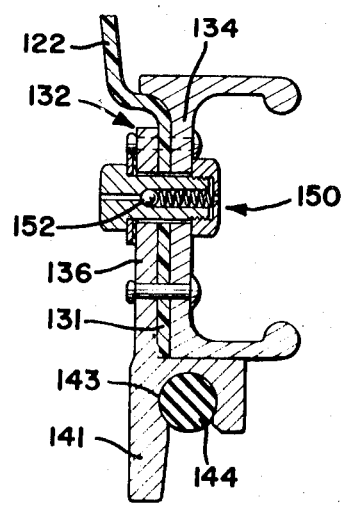
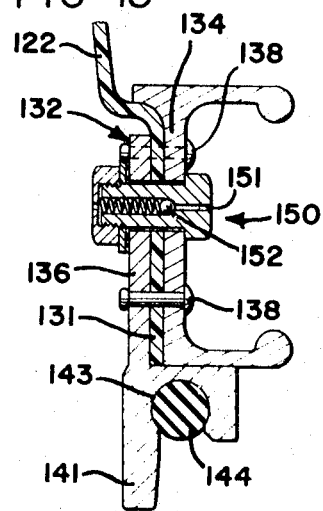
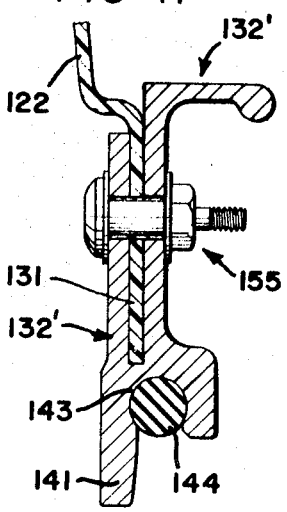

STEERABLY WHEELED TRANSPORTABLE CARGO CONTAINER

RELATED APPLICATION

This application is a continuation-in-part of application Ser. No. 795,189, filed Jan. 30, 1969 and assigned to the same assignee as the present invention and now abandoned.

This invention relates to transportation equipment, more particularly this invention relates to cargo containers.

It is an object of the invention to provide a novel cargo container with a removable top portion for carrying cargo therein and adapted to be conveniently loaded onto railway auto hauling railway cars and auto hauling truck trailers for hauling the merchandise and cargo containers to the delivery post for the merchandise.

It is a further object of the invention to provide a novel cargo container of a size to receive auto hauling railway cars which is mobile and may be readily loaded with cargo positioned on the railway car for transportal of the cargo.

It is another object of the invention to provide a novel mobile cargo container having removable tapered tops which may be placed in nested stacked relation for compact storage of the containers when not in use.

It is a further object of the invention to provide a novel cargo container which can be inexpensively made and produced.

Further objects and advantages of the invention will become apparent as the description proceeds and when taken in conjunction with the accompanying drawing wherein:

FIG. 6 is a top plan view of the cargo container invention with the top of the container removed;

FIG. 7 is a fragmentary longitudinal sectional view of the bed of the cargo container invention with a fragmentary showing of the removable top;

FIG. 8 is an enlarged cross-sectional view taken along line 8—8 of FIG. 3 illustrating the manner of connection of the removable top to the bed of the cargo container invention;

FIG. 9 is an enlarged cross-sectional view section of FIG. 8 showing the removable top portion which connects to the bed of the invention, prior to the connection of the top to the bed;

FIG. 10 is a side elevational view of a cargo trailer constructed in accordance with the invention;

FIG. 11 is a front end view of the cargo trailer shown in FIG. 1 and with a portion of the steering means removed;

FIG. 12 is a bottom view of the cargo trailer shown in FIGS. 1 and 2;

FIG. 13 is an enlarged section taken generally on the line 13—13 of FIG. 11 and showing the top member secured to the bed member by a latch mechanism;

FIG. 14 is an elevational view of the latch mechanism shown in FIG. 13;

FIGS. 15 and 16 are fragmentary sections of the top member, showing valve fittings for maintaining substantially atmospheric pressure within the cargo trailer; and FIG. 17 is a fragmentary section similar to FIG. 15 and showing a modification of the invention.

Figures 1, 2, 3, 4, 5:
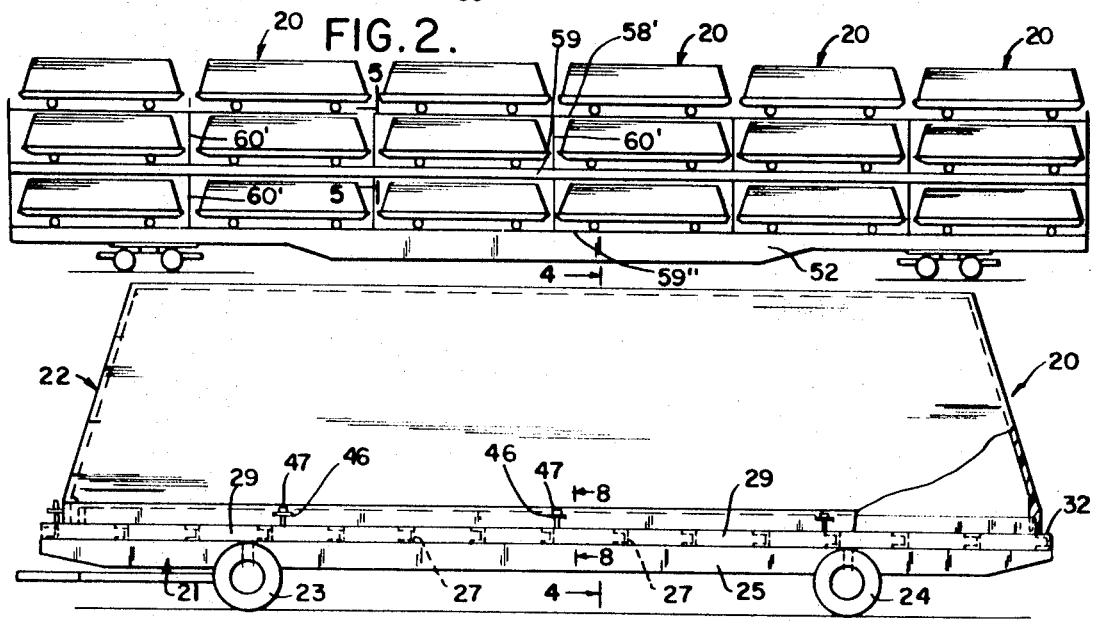
FIG. 1 is a side elevational view of the cargo container invention loaded onto a conventional auto hauling truck trailer.
FIG. 2 is a side elevational view of a plurality of the cargo containers loaded onto a conventional auto hauling railway car.
FIG. 3 is an enlarged side elevational view of the cargo container invention.
FIG. 4 is a cross-sectional view taken along line 4—4 of FIG. 3.
FIG. 5 is a cross-sectional view taken along line 5—5 of FIG. 1 and illustrating the end view of the cargo container invention loaded on the auto hauling truck trailer.

Briefly stated, the invention comprises a cargo container, having a flat bed member with wheels mounted to the bed, said bed having an annular upright flange extending about its outer edge, a removable top member having a frustoconical or truncated pyramidal configuration, said removable top having downwardly extending channel members along its lower outer edge adapted to be received in said upright flange of said bed, an annular resilient tubular sealing member extending along the apex of said channel member, whereby when said removable top is placed upon said upright flange member it will create an air tight seal between the top and bed member.

Referring more particularly to the drawing, in FIG. 3, the cargo container invention 20 is illustrated as having a flat bed member 21 with a removable top 22. The flat bed member 21 has four wheels 23, 23', 24, and 24' for moving cargo container device 20 from place to place. The flat bed member 21 is formed of two longitudinal channel members or beams 25 and 26, which run the length of the flat bed in parallel relation to one another, mounted laterally across the top of the beams 25 and 26, are fourteen laterally extending channel members 27 which run the width of the flat bed member.

Four Z-shaped flange members 29, 30, 31, and 32 extend around the edges of the flat bed members, with one vertical leg portion 33 of Z-members 29 and 30 extending downwardly and draped over the outer ends of the lateral members 27, along the length of the bed and with one vertical leg portion 33' of Z-members 31 and 32 extending downwardly and draped over the sides of the front and rear lateral members 27' and 27'' along the width of the flat bed, to provide an outer front and rear and side facing for the bed member.

The other vertical leg portion 34 of Z-members 29 and 30 extending upward along the outer edges of the length of the bed member to provide a mounting flange for the channel members 35 of the removable top to be received therein. The other leg portion 34' of Z-members 31 and 32 extending upward along the width of the outer edges of the bed member to also provide a mounting flange for the channel member 35 of the removable top to be received therein. The Z-members are welded to the lateral members 27 at their engaging areas to provide a permanent framework. A diamond tread aluminum alloy sheet 36 is fixed over the lateral member 27 with the confines of the upward extending vertical flanges to provide a floor for the flat bed member.

The flat bed member 21 has its front wheels 23 and 23' mounted for turning and towing in a conventional member with the wheels 23 and 23' pivotably about a vertical axis for turning the front wheels, with the wheels' hubs having vertical shafts extending laterally upward from the hubs into sleeves 37, which sleeves are fixed to the outside of the beams 25 and 26 whereby the vertical shafts may rotate in the sleeves thereby turning the wheels about the vertical axis of their sleeves. Tie rods 38 and 39 have their rearward ends fixed to the lower ends of the vertical shafts and extending rearward with connecting rod 40 pivotally connecting the tie rods together about a vertical axis. A tow rod 41 has its rearward end 42 pivotally attached about a vertical axis to the connecting rod 40 and an intermediate portion 43 pivotally mounted about a vertical axis to the beam 43' whereby the movement of the tow rod 41 horizontally in either direction laterally of its length moves the front wheels in either direction.

The removable top member 22 is made of a single piece molded lightweight plastic and has a frustoconical or truncated pyramidal shape with an inverted channel portion 35 extending entirely around the lower outer edge 22' of the top member. The channel portion 35 receives the four upright flanges 34 and 34' of the four Z-members 29–32, inclusive, when the top 22 is placed upon the bed to seal the top 22 to the bed 21. A resilient tubular sealing member 44 is attached along the apex 45 of the channel portions 35 to create an air tight seal between the top 22 and the bed 21.

A plurality of horizontal lugs 46 project outward from the lower edge 22' of the top 22, adjacent the channel portion 35. The lugs 46 each have a central bore 46' and a threaded bolt 47 passes through the bore 46' and its lower end 48 is threaded into bores 49 in the respective Z-members 29 through 32. To tighten the top 22 to the bed 21, when the bolts 47 are screwed down into the bores the enlarged heads 47' engage the upper face of the lugs 46 and draw the lugs downward thereby drawing the top 22 downward and forcing the upper edge 50 of the upright flanges 34 and 34' against the tubular sealing member 44 compressing the tubular sealing member from its position illustrated in FIG. 8 to its position illustrated in FIG. 9 thereby creating an air tight seal about the bottom of the top 22, between the top 22 and the bed 21.

The cargo containers are of a size to be easily loaded onto and closely received in conventional mobile auto hauling trailers 51 or conventional auto hauling railroad cars 52. The dimensions of the cargo containers 20 are 204 inches long, 61 inches in height and 86 inches in width so as to take up a space envelope of 17 feet by 7 feet 2 inches by 5 feet 1 inch. This size is such that they may be readily loaded onto the auto hauling trailer 51 or the auto hauling railroad cars 52 and each cargo container will be occupying the normal space occupied by an automobile.

The flat bed member, when the top member is removed, 22 is unobstructed on all sides except for the relatively narrow mounting flanges along the outside of the bed member 22. The flat bed member 22 sits only 17 inches off the ground and consequently it can be easily loaded by hand or forklift and the flat bed member provides 123 square feet of load bed.

The cargo container 20 is principally intended to be employed as a means of utilizing the dead or empty space in the auto hauling trailers and railroad cars which exist for them on the return trip after the automobiles have been delivered. The auto hauling truck trailers and auto hauling railroad cars haul automobiles from the assembly plants to various parts of the country. However, these trailers and railroad cars are normally hauled back to the assembly plant empty and this space on these trailers and railroad cars is wasted on the return trip.

It is contemplated that these cargo containers 20 could be stored at various parts of the country by the trucking and railway lines. The top 22 can easily be stacked in telescoping or nested relation being made of relatively light weight plastic and the bed members 21 take up only a minimum of space.

These stored containers 20 would then be employed by the railway and trucking lines, where they have on hand an empty auto hauling trailer or auto hauling railway car, by loading the cargo containers 20 with merchandise in the freight house and thereafter towing the cargo containers onto the upper and lower floors 58 and 59, respectively, between the upright side posts 60 of the trailer, or onto the upper, intermediate, and bottom floors 58', 59',0 and 59'', , respectively, and between the upright side posts 60' of the railway car, positioning them thereon as illustrated in FIGS. 1 and 2, whereupon the trailer and/or railway cars could be towed with cargo container and the merchandise therein to the various parts of the country where the merchandise is to be delivered.

Thus, by use of these novel cargo containers, the trailway and railroad companies could save a great deal of unnecessary expense, since these trailers and railway cars could be used to haul merchandise when the trailers and railway cars are being returned to their point of origin, or they could be used to haul merchandise to other parts of the country during the times the auto hauling trailers and railway cars are not needed for hauling cars. It is also contemplated that these cargo containers may be used in connection with air cargo transports in a similar manner.

Referring to FIGS. 10–17 which show another embodiment of a mobile cargo trailer constructed in accordance with the invention, a rectangular bed member 75 s constructed entirely of aluminum and includes a rigid frame formed by two longitudinally extending and parallel spaced aluminum I-beams 76 rigidly connected by a pair of aluminum cross beams 77. A pair of rear wheels 78 consist of aircraft type pneumatic tires which are supported by hubs 79 mounted on the I-beams 76 adjacent the ends of the rear cross beam 77. A mechanical brake is provided for each of the rear wheels 78, and the brakes are actuated by movement of cables 81 which extend from a lever actuator 82 mounted adjacent the forward end of the bed member 75.

The forward end portion of the bed member 75 is supported by a pair of front wheels 84 which employ the same tires as the rear wheels 78, but are mounted for pivotal movement on corresponding generally vertical axes 86. The front wheels 84 are steered by moving an elongated tongue 88 which is pivotally connected by a cross pin 89 to a plate 91 having a vertical pivot axis 92. A set of tie rods 93 connect the pivot plate 91 to a plate 94 supported by the front cross beam 77 for pivotal movement on an axis 76. The forward end portion of the pivot plate 94 is connected by a set of tie rods 97 to levers or arms 98 projecting forwardly from the pivotable hubs of the front wheels 84. As shown in FIG. 1, each end of each of the I-beams 76 has a sloping tapered surface 101 which forms an angle A of approximately 15° with a horizontal plane. The wheel base between the rear wheels 78 and the front wheels 84 is approximately 114 inches and cooperates with the sloping surfaces 101 to permit the cargo trailer to be rolled into an auto haul trailer of a semitrunk.

The bed member 75 also includes a plurality of longitudinally spaced aluminum cross members or beams 105 each having an H-shaped cross-sectional configuration as shown in FIG. 13. The cross beams 105 are rigidly secured to a flat aluminum sheet 106 which forms an air impervious upper deck surface 108 (FIG. 13) on which cargo is loaded. Preferably, the aluminum sheet 106 is welded to each of the cross beams 105, and a plurality of releasable securing means such as bayonet-type pin fasteners or bolts 110 (FIG. 12) secure the flanges of a plurality of the cross beams 105 to the upper flanges of the longitudinal I-beams 76 so that the cross beams 105 and the deck sheet 106 may be removed as a unit from the I-beams 76 after the fasteners 110 are released. A channellike frame 115 (FIG. 13) extends around the periphery of the deck sheet 106 and is rigidly secured by welds to the ends of the cross beams 105. The frame 115 includes an upwardly projecting peripherally extending rib 116 (FIG. 13) having an outwardly projecting continuous hook portion 117.

A rectangular inverted boxlike top member 120 comprises a one piece molded synthetic plastic or fiber glass cover 122 having generally flat opposite sidewalls 123 and opposite end walls 124 integrally connected by a substantially flat top wall 126. The top, side and end walls each have a substantially uniform wall thickness and include a plurality of spaced recesses 128 which form inwardly projecting wide reinforcing ribs. The side and end walls are each slightly tapered at an angle of approximately 3° (somewhat exaggerated in FIGS. 10 and 11) to provide for stacking a series of the top members 120 in nested relation and also to provide for conveniently molding the cover 122. These tapered side and end walls thus provide the top member 120 with an elongated generally truncated pyramid configuration.

Referring to FIG. 13, the molded plastic cover 122 includes a downwardly projecting and outwardly offset peripheral lip portion 131 which receives a rigid frame 132 including an outer portion 134 and an inner portion 136 each of which is extruded from aluminum and extends around the entire periphery of the cover 122. The lip portion 131 of the cover 122 is also sandwiched between the inner and outer frame portions 134 and 136 and is secured to the frame portions by a series of longitudinally spaced rivets 138. A peripherally extending lip 141 projects downwardly from the inner frame portion 136 and is located inwardly of the upwardly projecting rib 116 on the bed member 75 when the top member 120 is properly seated on the bed member.

A peripherally extending cavity 143 of circular cross section is formed within the inner frame portion 136 and receives a resilient seal member 144 of circular cross section. When the top member 120 is seated on the bed member 75, (FIG. 13) the resilient seal 144 engages the top surface of the rib 116 and forms a continuous substantially airtight seal between the lower edge portions of the side and end walls of the top member and the outer periphery of the bed member 75.

Referring to FIGS. 15 and 16, a pair of fittings 150 are mounted within the frame 132 of the top member 120 in a reverse orientation, and each fitting defines an air passage 151. The fittings 150 each include a spring loaded ball-type check valve 152 and are employed to assure that the air pressure within the enclosed cargo space will remain substantially the same as the outside atmospheric pressure. For example, when the assembled bed member 75 and the top member 120 are being transported by an airplane, the valve fittings 150 provide for the changes in atmospheric pressure with difference in elevation.

Referring to FIG. 17, an extruded aluminum frame 132' has substantially the same cross-sectional configuration as the frame 132, but the inner and outer frame portions are extruded as one piece. The lower lip portion 131 of the cover 122 is secured to the frame 132' by a suitable adhesive. This modification has the advantage of eliminating the need for the rivets 138 and thus provides for a somewhat more simplified assembly. Also shown in FIG. 17 is a valve fitting 155 which is substantially the same as a conventional automobile tire valve and which extends through the frame 132' to provide for supplying either air or an inert gas to the enclosed cargo space or to provide for creating a partial vacuum within the space.

As shown in FIGS. 10, 11, 13 and 14, a series of toggle latches 160 are mounted at spaced intervals around the frame 132, and each latch 160 includes a handle portion 162 pivotally supported by a pin 163 which extends through a T-shaped bracket 164 secured to the frame 132. A catch portion 166 is pivotally connected to the handle portion 162 by a set of aligned pins 167 and has a lower hook portion 168 which is adapted to engage the hook portion 117 on the frame 115 extending around the periphery of the bed member 75. A torsion spring 170 biases the handle 162 to a closed position (FIGS. 13 and 14), and the pins 163 and 167 are arranged to provide overcenter locking of the latch when the handle portion 162 is pivoted upwardly to its locked position. A hole 172 is formed within each bracket 164 and is adapted to receive a lock or a cable which extends around the periphery of the top member 120 to lock each of the latches 160 in its locked position shown in FIG. 13.

From the drawings and the above description, it is apparent that a mobile cargo trailer constructed in accordance with the present invention provides many desirable features and advantages. For example, when the top member 120 is lifted or removed from the bed member 75, the upper flat surface of the bed member may be conveniently loaded with cargo from either side or from either end of the trailer. As mentioned above, the overall width of approximately 86 inches of the trailer provides for an inside space of approximately 82 inches, and the overall length of 204 inches provides for an inside length within the top member of approximately 192 inches. As a result of these dimensions, the upper surface of the bed member 75 will accommodate eight loaded standard 40 inch by 48 inch pallets or twelve standard 32 inch by 40-inch pallets. Moreover, the low height of approximately 17 inches from the ground to the top deck surface 108 of the bed member provides for conveniently loading and unloading the loaded pallets onto the bed member 75 with a forklift truck.

When the air impervious top member 120 is positioned on the bed member 75, a continuous airtight seal is formed between the bed member 75 and the lower peripheral edge portion of the top member 120 so that the loaded cargo is defined within a substantially airtight enclosure. The construction and arrangement of the latches 160 not only provide for rigidly securing the top member 120 to the bed member 75, but also provides for conveniently locking the top member to the bed member. Furthermore, the latches 160 are arranged so that they do not project outwardly beyond the outer edge surface of either the bed member 75 or the top member 120 to avoid accidental damage to the latches 160. The construction of the top member 120 provides another advantage in that when a plurality of the top members are stacked, the frame members 132 rest one on top of the other so that an excessive load is not produced on the lower plastic covers 122 within the stack.

While the forms of cargo trailers herein described constitute preferred embodiments of the invention, it is to be understood that the invention is not limited to these precise forms of cargo trailer, and that changes may be made therein without departing from the scope of the invention which is defined in the appended claims.

What is claimed is:

1. A mobile cargo trailer adapted to be rolled onto and transported by a semitruck having a rack used for hauling automobiles, said cargo trailer comprising an elongated substantially rectangular bed member including a rigid frame, means secured to said frame and forming a substantially flat air impervious rigid surface for supporting a load of cargo, a pair of front wheels and a pair of rear wheels mounted on said frame and supporting said bed member for towing, one of said pairs of wheels being supported for pivotable movement on corresponding generally vertical axes, tongue means for steering the pivotable said wheels and towing the trailer, a substantially rigid air-impervious top member mounted on said bed member for covering the cargo loaded on said surface and including substantially flat side and end walls connected by a substantially flat top wall and defining a truncated pyramid configuration, said top member being removable from said bed member to provide for direct unobstructed loading of a plurality of cargo pallets onto said surface from both sides of said bed member, said side and end walls of said top member having lower edge portions extending adjacent said bed member, means forming a continuous airtight seal between said lower edge portions of said side and end walls and said bed member and cooperating with said air impervious surface and said air impervious top member to define an airtight enclosure for the cargo, and means for releasably securing said top member to said bed member.

2. A mobile cargo trailer as defined in claim 1 wherein said top member comprises a rigid one piece synthetic plastic top member wherein said side and end walls are integral with said top wall.

3. A mobile cargo trailer as defined in claim 1 wherein said bed member has a length of approximately 17 feet and a width of approximately 7 feet.

4. A mobile cargo trailer as defined in claim 1 wherein said supporting surface of said bed member is disposed approximately 17 inches above a surface supporting the trailer.

5. A mobile cargo trailer as defined in claim 1 wherein said top wall extends parallel to said supporting surface of said bed member and is disposed approximately 5 feet above a surface supporting the trailer.

6. A mobile cargo trailer as defined in claim 1 wherein said seal forming means comprise a rigid frame member extending around said bed member and forming the outer peripheral edge surface of said bed member, a peripheral flange projecting upwardly from said frame member, means on said lower edge portions of said side and end walls of said top member for defining a downwardly facing peripheral channel, and resilient means disposed within said channel for engaging said flange.

7. A mobile cargo trailer adapted to be rolled onto and transported by a semitruck having a rack used for hauling automobiles, said cargo trailer comprising an elongated substantially rectangular bed member including a rigid frame, means secured to said frame and forming a substantially flat air impervious rigid surface for supporting a load of cargo, a pair of front wheels and a pair of rear wheels mounted on said frame and supporting said bed member for towing, one of said pairs of wheels being supported for pivotable movement on corresponding generally vertical axes, tongue means for steering the pivotable said wheels and towing the trailer, a substantially rigid air impervious top member mounted on said bed member for covering the cargo loaded on said surface and including substantially flat side and end walls connected by a substantially flat top wall, said top member being removable from said bed member to provide for direct unobstructed loading of a plurality of cargo pallets onto said surface from both sides of said bed member, said side and end walls of said top member having lower edge portions extending adjacent said bed member, means forming a continuous airtight seal between said lower edge portions of said side and end walls and said bed member and cooperating with said air impervious surface and said air impervious top member to define an airtight enclosure for the cargo, and means for releasably securing said top member to said bed member.

8. A mobile cargo trailer as defined in claim 7 wherein said top member comprises a rigid one piece synthetic plastic top member wherein said side and end walls are integral with said top wall.

9. A mobile cargo trailer as defined in claim 7 wherein said top member has a downwardly projecting peripheral lip portion, a generally rectangular metal frame receiving said lip portion, an upwardly projecting peripheral rib member on said bed member, and a continuous resilient seal member carried by said frame and engaging said rib member.

10. A mobile cargo trailer as defined in claim 7 including means defining a passage for removing air from said enclosure, and valve means within said passage.

11. A mobile cargo trailer as defined in claim 7 including means for releasably securing said bed member to said frame to provide for removing said bed member and said top member from said frame as a unit without disturbing said airtight enclosure.

12. A mobile cargo trailer as defined in claim 7 wherein said top member includes a peripherally extending rigid frame mounted on said lower edge portions of said walls, a plurality of peripherally spaced latch members mounted on said frame and adapted to engage said bed member, and said frame and said bed member cooperate to define a cavity for receiving and protecting each said latch member.

13. A mobile cargo trailer as defined in claim 7 including means for braking at least one pair of said wheels, and means located adjacent said tongue means for actuating said braking means.